(12) United States Patent
Yu et al.

(10) Patent No.: US 8,596,506 B2
(45) Date of Patent: Dec. 3, 2013

(54) ADAPTING APPARATUS FOR MOUNTING AN ACCESSORY EQUIPMENT ON A BICYCLE

(75) Inventors: Chia-Fang Yu, Taipei Hsien (TW); Mao-Yi Chen, Taipei Hsien (TW); Kuan-Chien Chen, Taipei Hsien (TW); Wen-Chun Cheng, Taipei Hsien (TW)

(73) Assignee: Sinox Company Ltd., New Taipei (TW)

( * ) Notice: Subject to any disclaimer, the term of this patent is extended or adjusted under 35 U.S.C. 154(b) by 804 days.

(21) Appl. No.: 12/656,033

(22) Filed: Jan. 14, 2010

(65) Prior Publication Data

US 2010/0200630 A1 Aug. 12, 2010

Related U.S. Application Data

(60) Provisional application No. 61/144,448, filed on Jan. 14, 2009, provisional application No. 61/144,456, filed on Jan. 14, 2009, provisional application No. 61/146,653, filed on Jan. 23, 2009.

(51) Int. Cl.
*B62J 7/06* (2006.01)

(52) U.S. Cl.
USPC ........... 224/448; 224/419; 224/420; 224/441; 224/447; 224/569; 224/935

(58) Field of Classification Search
USPC ......... 224/419, 420, 441, 447, 448, 450, 535, 224/569, 935; 70/30, 49, 51, 233–235, 258
See application file for complete search history.

(56) References Cited

U.S. PATENT DOCUMENTS

| 4,711,107 | A | * | 12/1987 | Drane | 70/233 |
| 5,735,441 | A | * | 4/1998 | Fujimoto | 224/420 |
| 5,889,463 | A | * | 3/1999 | Judd et al. | 340/427 |
| 7,661,280 | B1 | * | 2/2010 | Weyland | 70/233 |

* cited by examiner

*Primary Examiner* — Adam Waggenspack
(74) *Attorney, Agent, or Firm* — Opes IP Consulting Co. Ltd.; Laurence Kao

(57) ABSTRACT

An adapting apparatus for mounting an accessory equipment on a bicycle is disclosed. The adapting apparatus comprises: a base having a mounting mechanism, a securing mechanism and a lock; an adaptor detachably mounted to the mounting mechanism of the base, the adaptor having an adapting mechanism for connecting to an accessory equipment; and a securing member detachably connected to the base through the securing mechanism and fastened to a portion of a bicycle; wherein, the lock, the mounting mechanism and the adaptor being configured such that the adaptor can be detached from the mounting mechanism only when the lock is unlocked.

7 Claims, 15 Drawing Sheets

ADAPTING APPARATUS FOR MOUNTING AN ACCESSORY EQUIPMENT ON A BICYCLE

CROSS-REFERENCE TO RELATED APPLICATIONS

This application is related to and claims priority to U.S. Provisional Application No. 61/144,448, filed on Jan. 14, 2009, entitled "Handlebar Lock System"; U.S. Provisional Application No. 61/144,456, filed on Jan. 14, 2009, entitled "Lock System for Bicycle Bag"; and U.S. Provisional Application No. 61/146,653, filed on Jan. 23, 2009, entitled "Bicycle Lock System."

FIELD OF THE INVENTION

The invention relates to an adapting apparatus for mounting an accessory equipment on a bicycle, and more particularly, to an adapting apparatus with locking capability for securely mounting an accessory equipment on a bicycle.

BACKGROUND OF THE INVENTION

With growing popularity of bicycles, cyclists can be found everywhere, whether in the city, in the suburbs, or on the road. Accordingly, cyclists' safety becomes an important issue and safety equipments are in high demand. Aside from the typical body wears and helmets, safety equipments for bicycle also include headlights, bike bells bike locks, odometers and toolkits.

The abovementioned equipments are generally mounted on the handlebar or on the seatpost below the saddle, or stored in a carrier attached to the bicycle. A wide range of accessory equipments can often be seen mounted on the handlebar of a bicycle. However, the length and shape of the handlebar may vary due to functional or aesthetical considerations, and handlebars with shorter length or irregular shape are becoming more popular. This creates a problem for properly securing accessory or safety equipments on the handlebar.

SUMMARY OF THE INVENTION

In a first aspect of the invention, there is an adapting apparatus for mounting an accessory equipment on a bicycle, comprising: a base having a mounting mechanism, a securing mechanism and a lock; an adaptor detachably mounted to the mounting mechanism of the base, the adaptor having an adapting mechanism for connecting to an accessory equipment; a securing member detachably connected to the base through the securing mechanism; and a fastening member fastening the securing member both to the base and to a portion of a bicycle. The lock, the mounting mechanism and the adaptor are configured such that the adaptor can be detached from the mounting mechanism only when the lock is unlocked.

In a second aspect of the invention, there is an adapting apparatus for mounting an accessory equipment on a bicycle, comprising: a base having a mounting mechanism, a securing mechanism, a first fastening hole extending through the mounting mechanism along a first axis, and a lock; an adaptor detachably mounted to the mounting mechanism of the base along a second axis, the adaptor having an adapting mechanism for connecting to an accessory equipment; a securing member detachably connected to the base through the securing mechanism and having a second fastening hole extending through the securing member along the first axis and aligning with the first fastening hole; and a fastening member extending through the first fastening hole and the second fastening hole such that the securing member is fastened both to the base and to a portion of a bicycle. The first axis is different from the second axis such that the mounting of the adaptor on the mounting mechanism prevents the removal of the fastening member. Additionally, the lock, the mounting mechanism and the adaptor being configured such that the adaptor can be detached from the mounting mechanism only when the lock unlocked.

In a third aspect of the invention, there is an adapting apparatus for mounting an accessory equipment on a bicycle, comprising: an adaptor having a mounting mechanism on a first surface for connecting to an accessory equipment, a securing mechanism on a second surface, and a lock, wherein the first surface is different from the second surface; and a securing member detachably connected to the securing mechanism of the adaptor. The lock, the securing mechanism of the adaptor, and the securing member are configured such that the securing member can be detached from the securing mechanism of the base only when the lock is unlocked.

In a forth aspect of the invention, there is an adapting apparatus for mounting an accessory equipment on a bicycle, comprising: a base having a mounting mechanism and a lock, wherein the base is integrally made with a portion of a bicycle; an adaptor detachably mounted to the mounting mechanism of the base, the adaptor having an adapting mechanism for connecting to an accessory equipment. The lock, the mounting mechanism and the adaptor are configured such that the adaptor can be detached from the mounting mechanism only when the lock is unlocked

DETAILED DESCRIPTION

Figure 1:
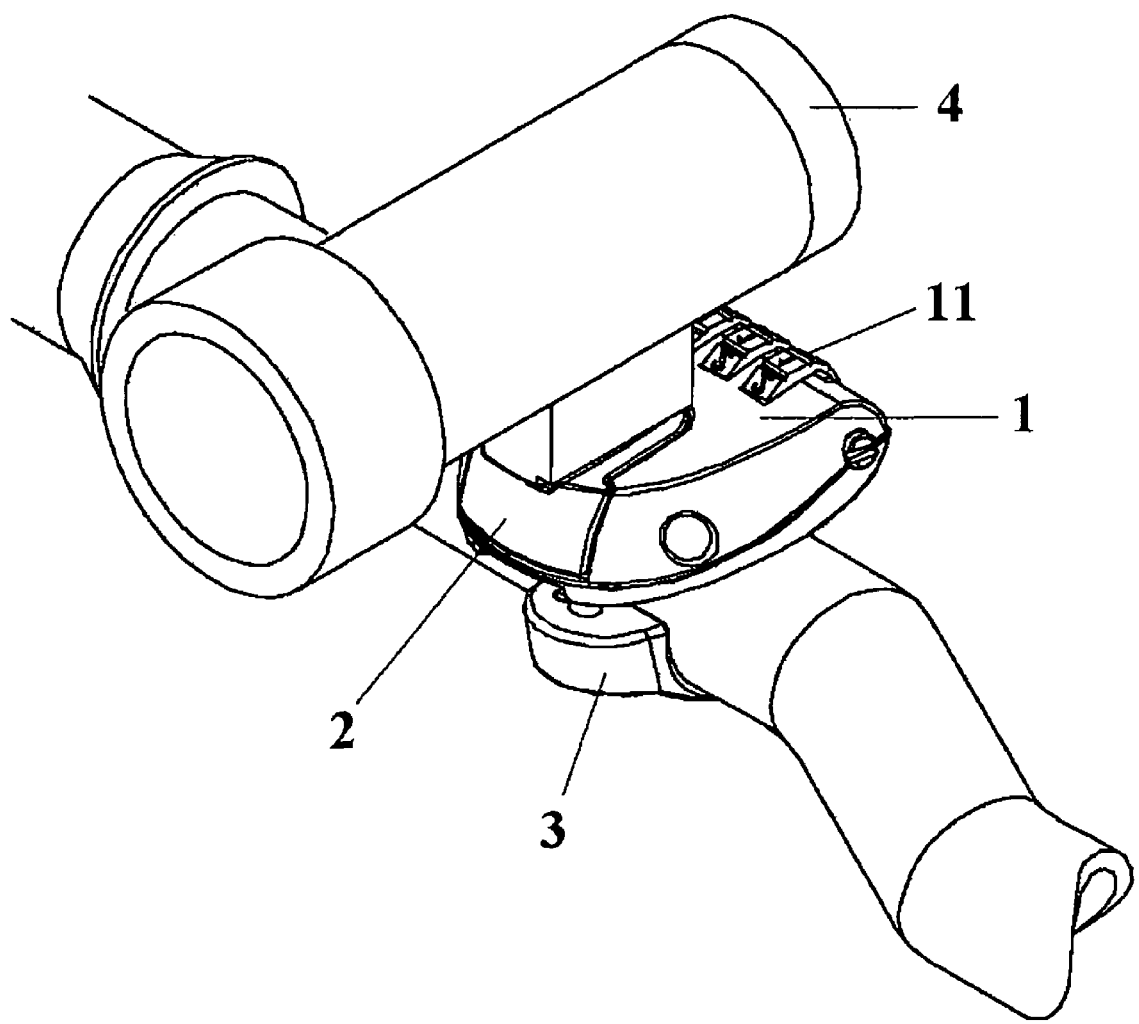
FIG. 1 shows a perspective view of the adapting apparatus of the first embodiment of the invention.

Please refer to FIG. 1, which is a perspective view of the adapting apparatus of the first embodiment of the present invention. As shown in FIG. 1, an adaptor 2 is mounted on the base 1, which is secured on the handlebar of a bicycle through a securing member 3. An accessory, for example a flashlight 4, is mounted on the adaptor 2 in a manner detailed below. The base 1 further includes a lock 11 that determines the detachability of the securing member 3 from the base 1 and the adaptor 2 from the base 1 in a manner detailed below.

Figure 2:
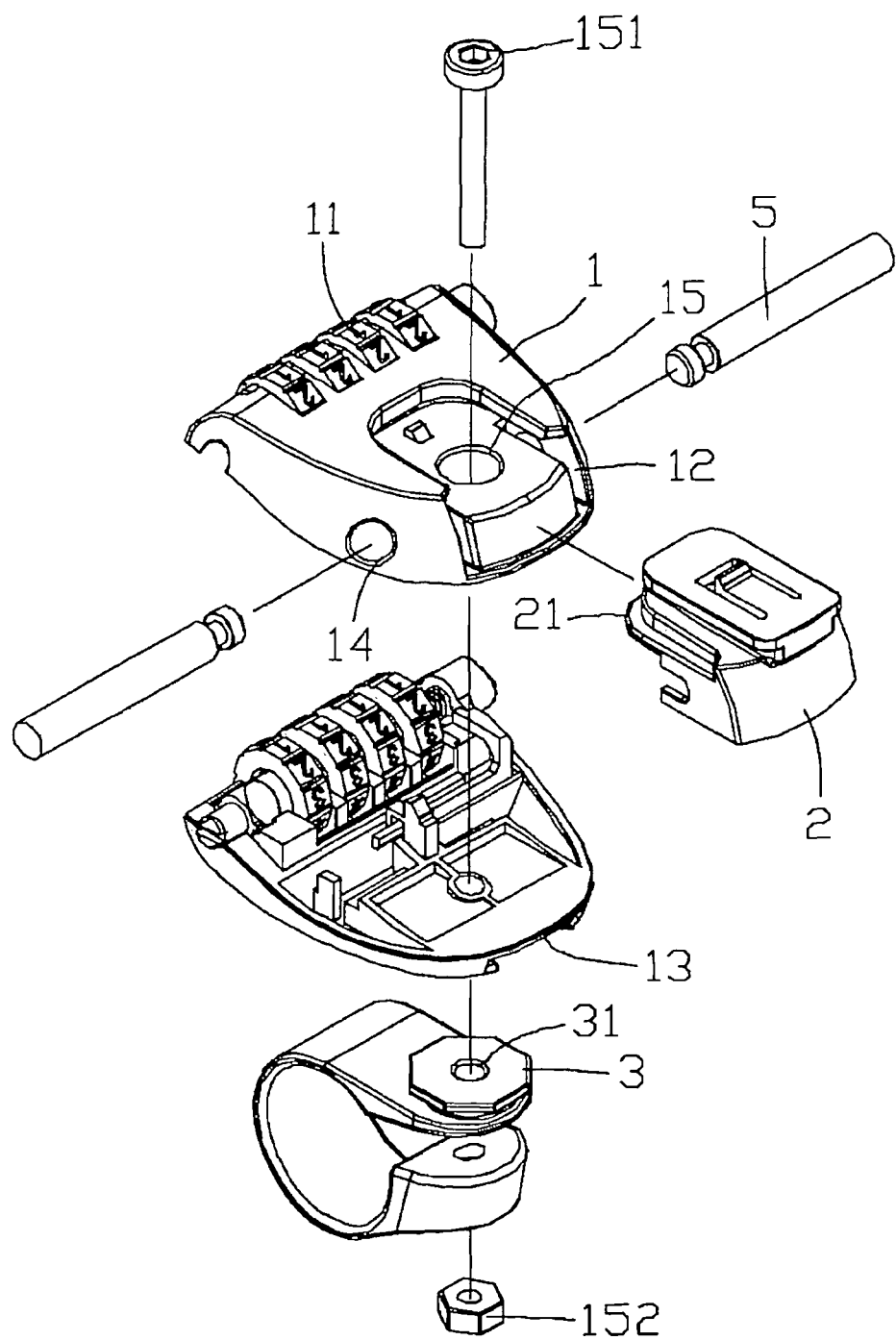
FIG. 2 shows an exploded view of the adapting apparatus of the first embodiment of the invention.

Please refer to FIG. 2, which is an exploded view of the adapting apparatus of the first embodiment of the present invention. As shown in FIG. 2, the apparatus of the present invention includes a base 1, an adaptor 2, and a securing member 3. The base 1 further comprises a combination lock 11, a mounting dock 12 for receiving the adaptor 2, a securing slot 13 for receiving the securing member 3, locking holes 14 for engaging with a cable 5, and a fastening hole 15 through which a screw 151 can be fastened to the securing element 3 with a nut 152.

The lock 11 controls the detachability of the adaptor 2 from the mounting dock 12. The lock 11 in the base 1 can be configured so that the adaptor 2 can be inserted in or removed from the mounting dock 12 only when the lock 11 is in an "unlocked" position. Likewise, the lock 11 in the base 1 can be configured so that the cable 5 can be inserted in or removed from the locking hole 14 only when the lock 11 is in an "unlocked" position. The detailed mechanism for performing this function is well known in the art. The following description of the locking mechanism is by way of illustration only and not intended to limit the scope of the present invention.

Figure 11A:
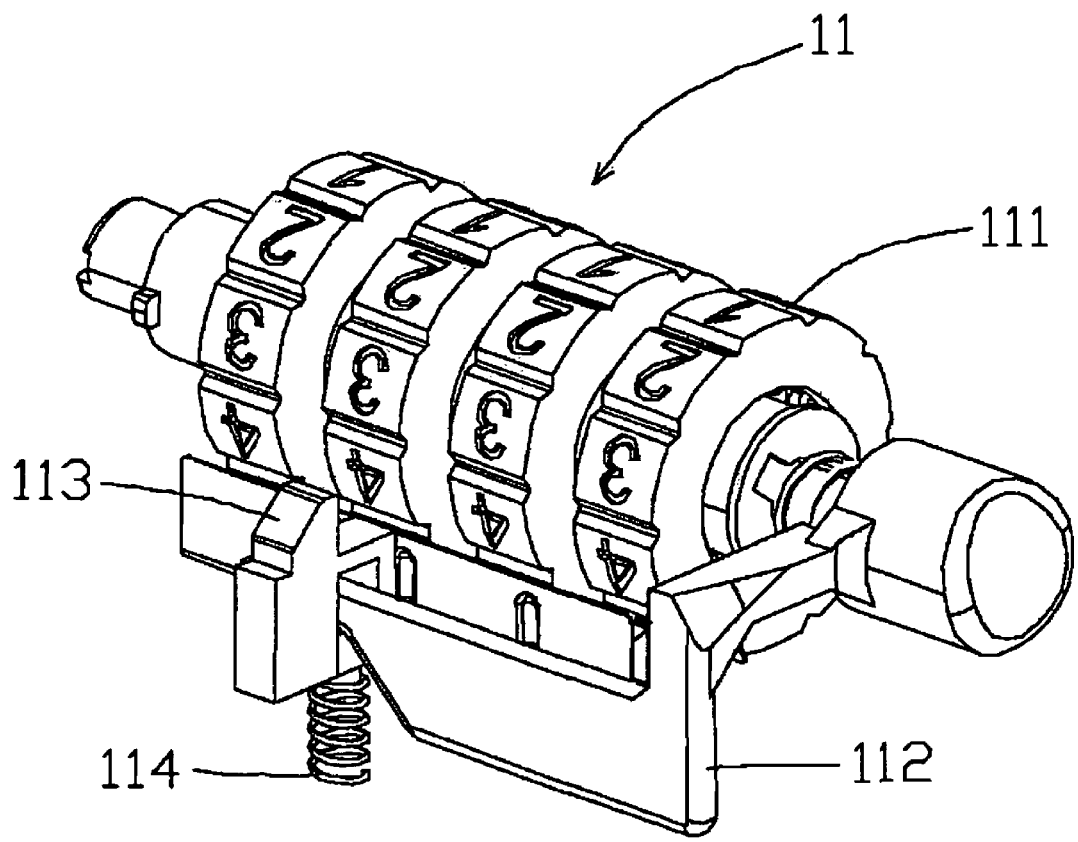
FIG. 11A shows an example of the interior mechanism of the lock.
Figure 11B:
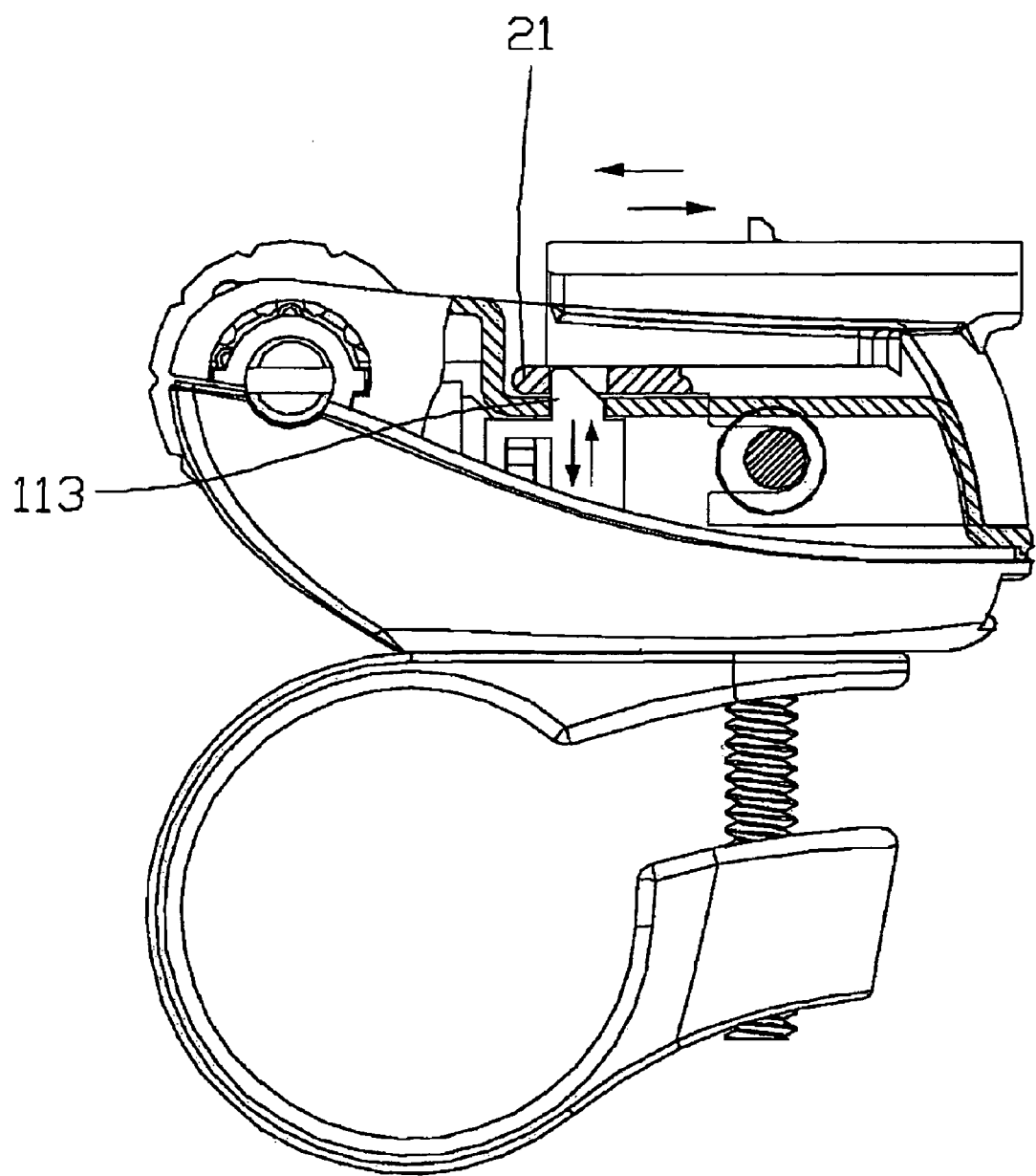
FIG. 11B is a cross sectional view of the adapting apparatus of the invention.

Please refer to FIGS. 11A and 11B, which illustrate the interaction between the lock 11 and the movement of the adaptor 2 relative to the base 1. In FIG. 11A, the lock 11 includes four dials 111, a sliding plate 112 and a locking tongue 113 propped by a spring 114. As can be seen in the figure, the plate 112 and the tongue 113 interact in a way that the horizontal movement of the plate 112 controls the vertical movement of the tongue 113. More specifically, when the lock 11 is unlocked, the plate 112 slides toward the left, and forces the tongue 113 to move downward. FIG. 11B is a cross sectional view of the adapting apparatus of the present invention. In FIG. 11B the lock is shown in the "locked" status. Once the lock 11 is unlocked and tongue 113 is forced to move downward, the adaptor 2 is no longer restricted by the tongue and is free to be removed from the base 1. The same mechanism can be employed with regard to the cable lock or securing member if their releasability is also controlled by the lock 11.

Referring to FIG. 2, if the screw 151 correctly goes along a first axis through the mounting hole 15 of the base 1 and the mounting hole 31 of the securing element 3, which in turn is secured on a handlebar of a bicycle, the base 1 is firmly fastened. The adaptor 2 slides on the mounting dock along a second axis and is secured in the mounting docking 12. The configuration of the adapting apparatus is such that the mounting of the adaptor 2 covers the screw 151, and therefore prohibits the relative movement between the securing member 3 and the base 1, as well as unauthorized unscrewing of the screw 151. Additionally, once the lock 11 is locked, the adaptor 2 cannot be removed, and consequently the securing element 3 is secured in the securing slot 13, the adaptor 2 or the base 1 cannot be removed without physically damaging the apparatus or the handlebar of the bicycle. Here the first axis is perpendicular to the second axis. However, the relation between the first axis and the second axis is not limited, so long as the adaptor 2 prohibits the removal of the securing member 3 from the base 1.

The lock 11 is not limited in any form. Examples of the lock 11 include a combination lock, a key lock, or the combination thereof.

The securing member in the present embodiment is a C-ring, but other comparable securing member can also be used, so long as it provides sufficient securing capability against a rod-shape object such that the base 1 as well as the accessory equipment mounted thereon can maintain proper position or viewing angle to the cyclist's convenience. More details are provided in FIG. 5. A person having ordinary skill in the art can readily perceive plausible alternatives, and those should still be covered by the present invention.

Figure 3:
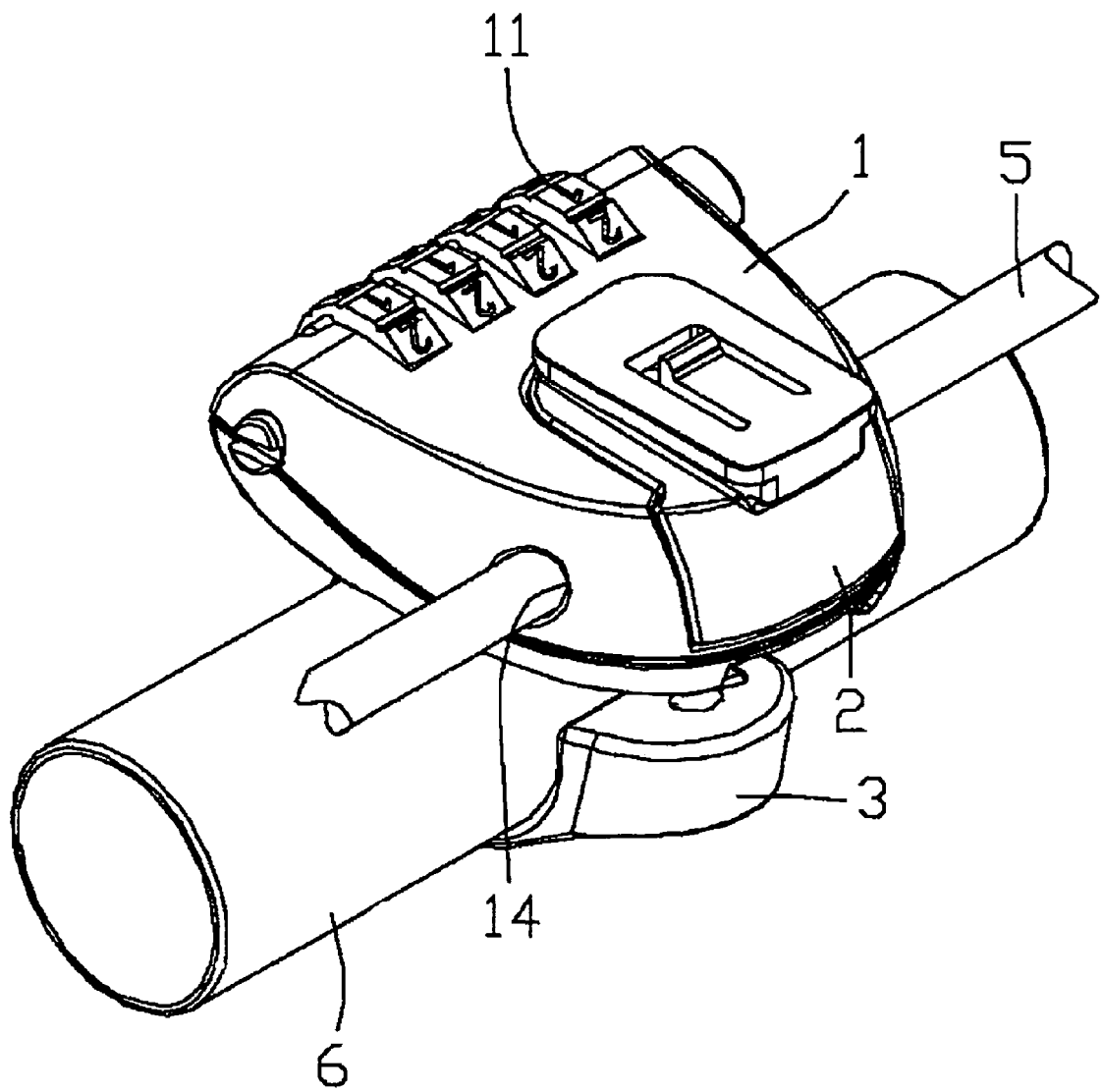
FIGS. 3-7 show the variations of the adapting apparatus of the first embodiment of the invention.
Figure 4:
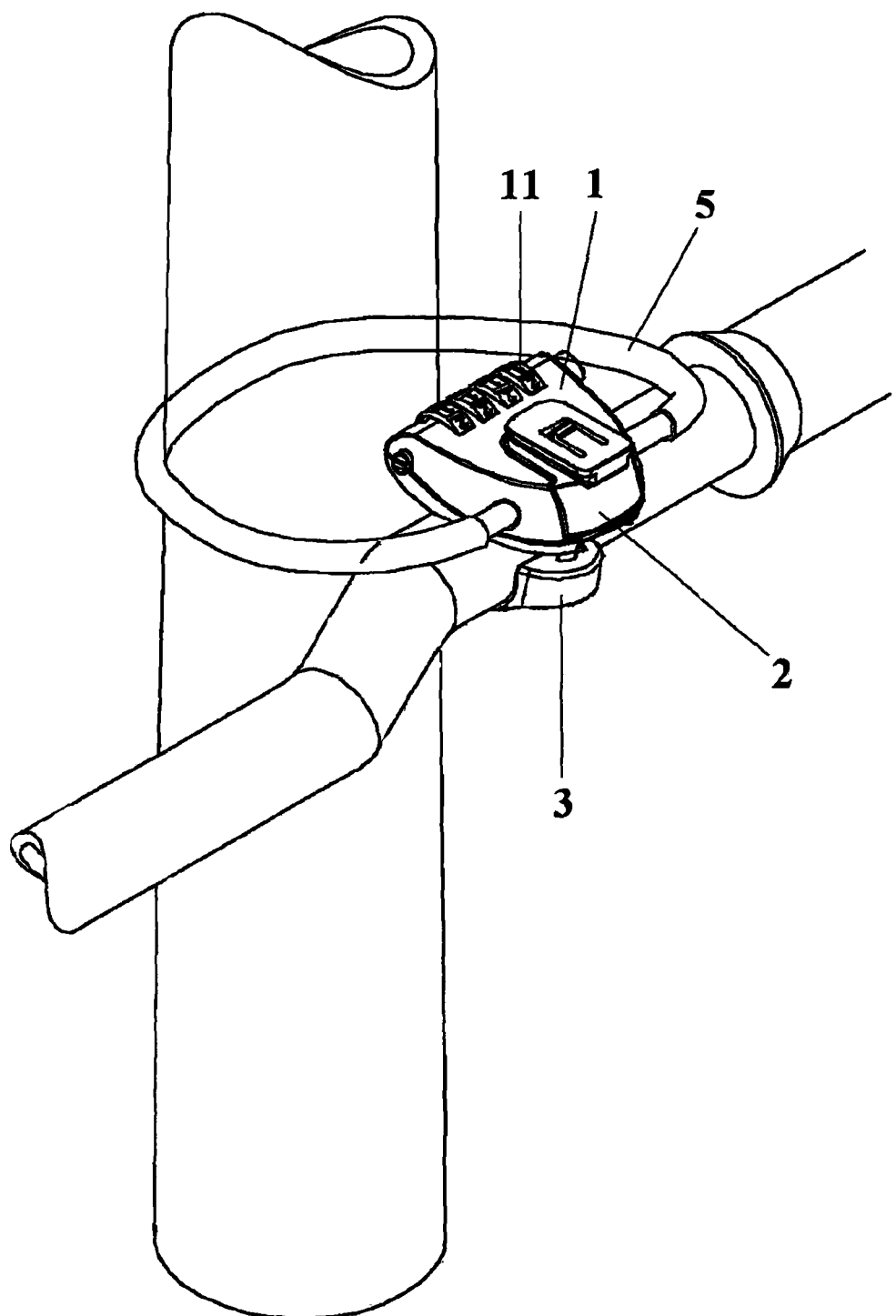

Please refer to FIGS. 3-4, which show an additional feature of the present invention. A cable 5 with both ends inserted in the locking holes 14 is shown in FIGS. 3-4. As mentioned above, the lock 11 of the base 1 is configured so that it can also control the releasability of a cable lock 5. As shown in FIG. 4, the cable 5 can be used to secure against a light pole or a bicycle rack, just like other ordinary bicycle lock. The improvement of the this configuration lies in that only one lock in the base is required to control three separate items, namely the accessory equipment, the cable lock, and the securing member. In conventional way it would require three different sets of combination code or three different keys to achieve the same function. With the adapting apparatus of the present invention, the burden on the cyclist is greatly reduced. He or she only needs to bring one key or remember one set of combination code in order to unlock the lock 11.

Additionally, a retractable cable lock can be incorporated with the lock 11 such that a cyclist does not have to carry an extra cable lock.

Figure 5:
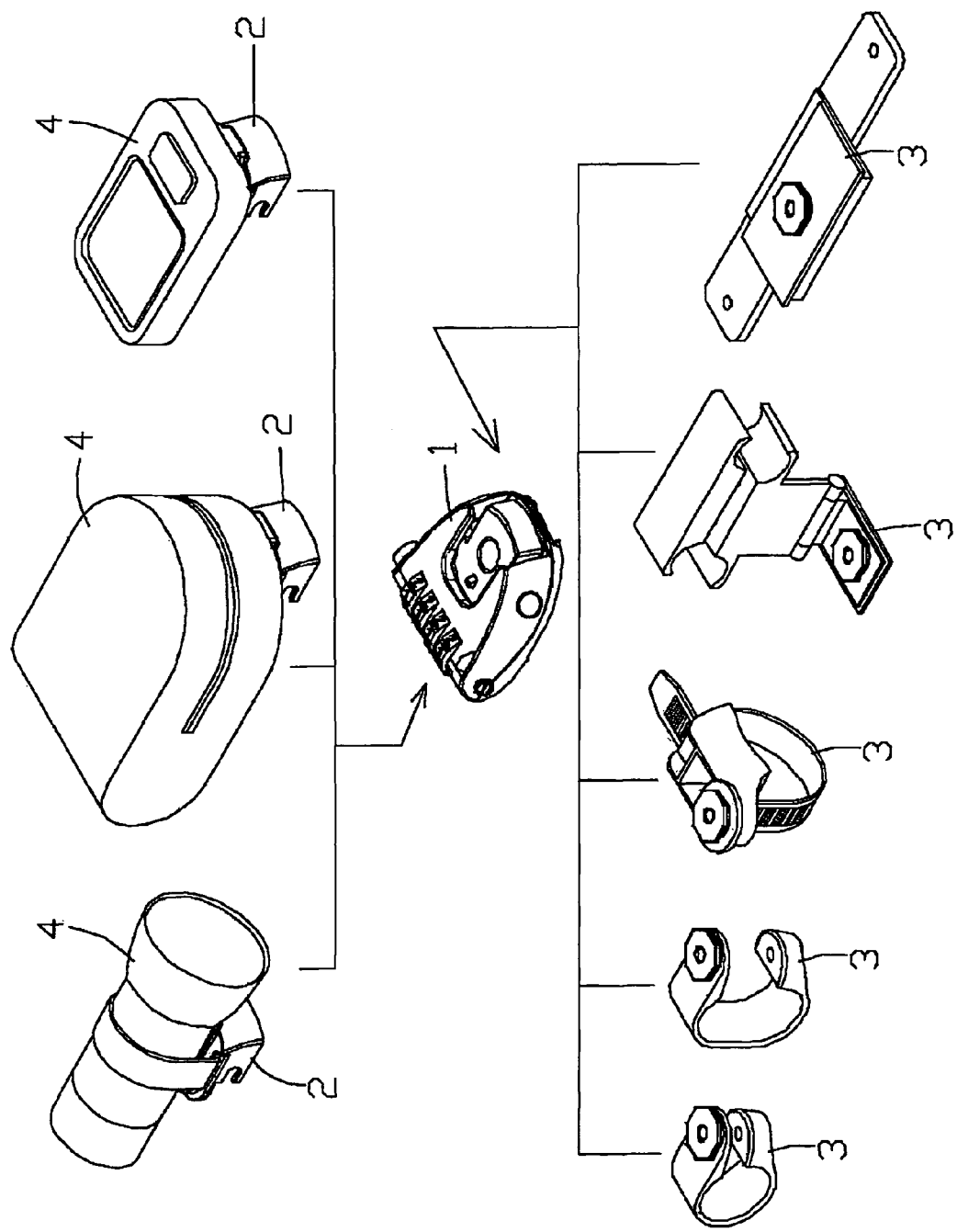

FIG. 5 shows examples of the accessory equipments that can be used on the adapting apparatus of the present invention, and also examples of securing members that can be used to securely fasten the base 1 onto different portion of a bicycle. For example, the accessory equipment can be a flashlight, a helmet, a heart rate monitor, a GPS, or an odometer/speedometer, so long as the accessory equipment itself can be mounted on the adaptor 2.

The securing member that can be used in the adapting apparatus of the present invention is not limited, so long as it can be securely fastened onto a portion of a bicycle, and also provides a suitable connection to the base such that the securing member cannot be removed from the base without first unlocking the lock 11 of the base 1. Examples of the securing member include, in FIG. 5 from left to right, a C-ring, a adjustable belt (pull-tight), a seatpost connector, a saddle connector, and a down-tube connector.

Figure 6A:
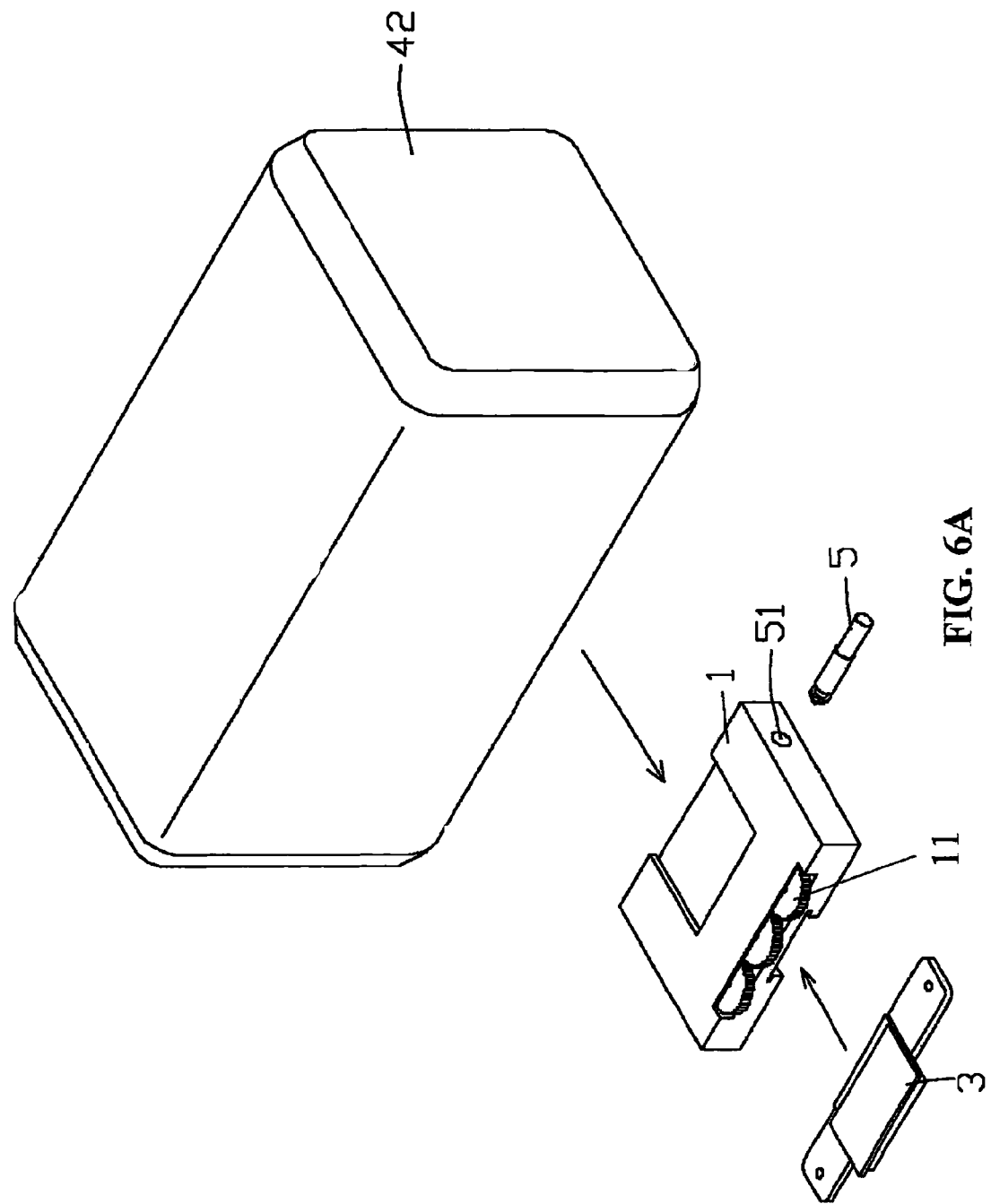
Figure 6B:
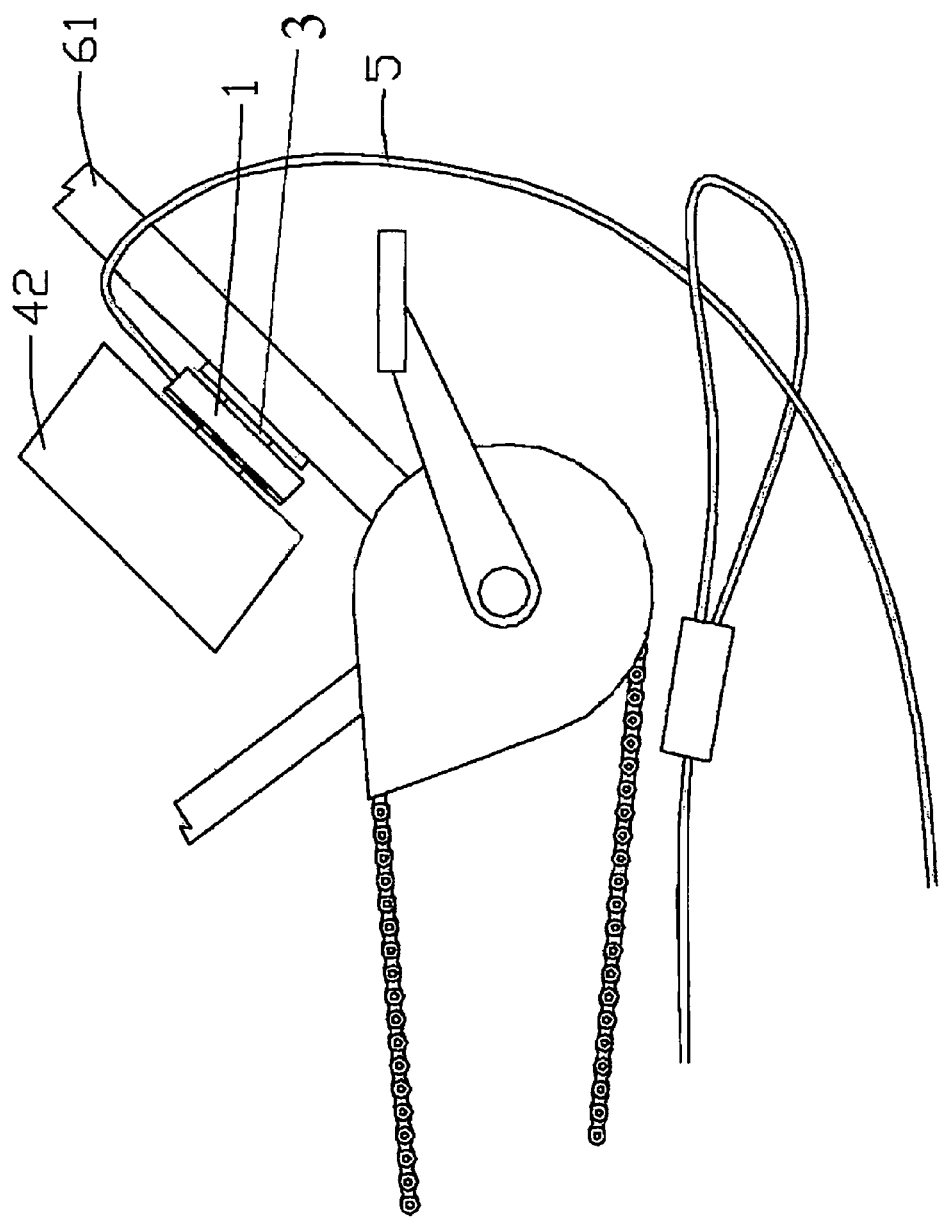

Please refer to FIGS. 6A and 6B, which show a variation of the first embodiment of the present invention. As can be seen in FIG. 6A, an adapting apparatus includes a base 1, a down-tube connector 3, a storage box 42 and a cable 5. For illustration purposes, the adaptor located at the bottom of the storage box 42 as an integral part is not shown. One end of the cable 5 can be inserted in the cable lock hole 51 on the side of the base 1. The down-tube connector 3 can be inserted in the securing slot of the base 1. As shown in FIG. 6B, down-tube connector 3 is in turn secured against the down-tube of the bicycle. The cable lock 5 includes in its one end a closed loop so that the other end of the cable can run through the wheel and the closed loop and finally be inserted in the cable lock hole 51. This way, as long as the lock (not shown) remains locked, protection against theft can be provided for both the storage box and the bicycle itself. Note that in this variation, the connection between the base 1 and the securing member 3 is directly controlled by the lock 11 of the base 1, unlike the structure shown in FIGS. 1-2, so that the relationship between the adaptor 2 and the securing member 3 is of less importance in this variation.

Figure 7A:
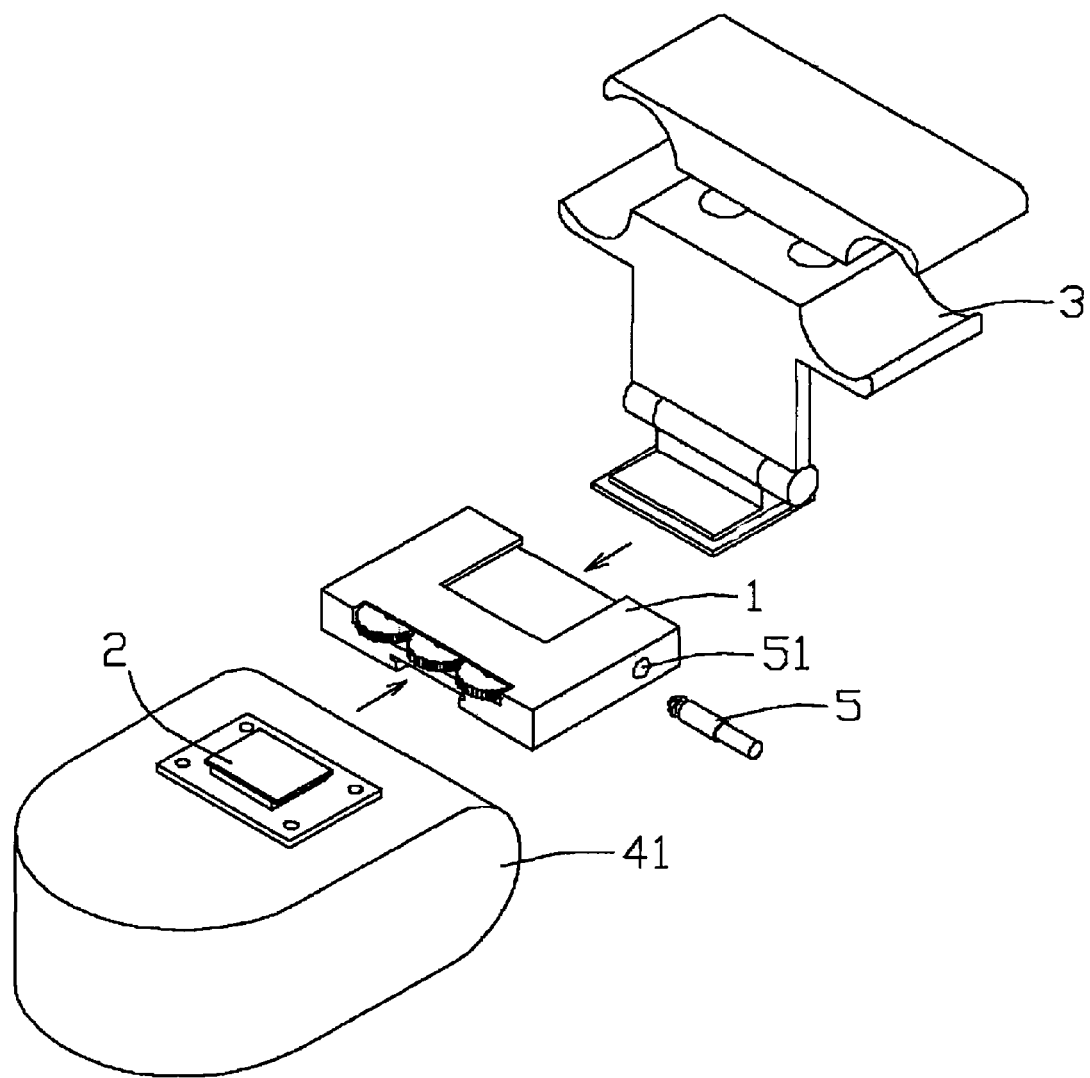
Figure 7B:
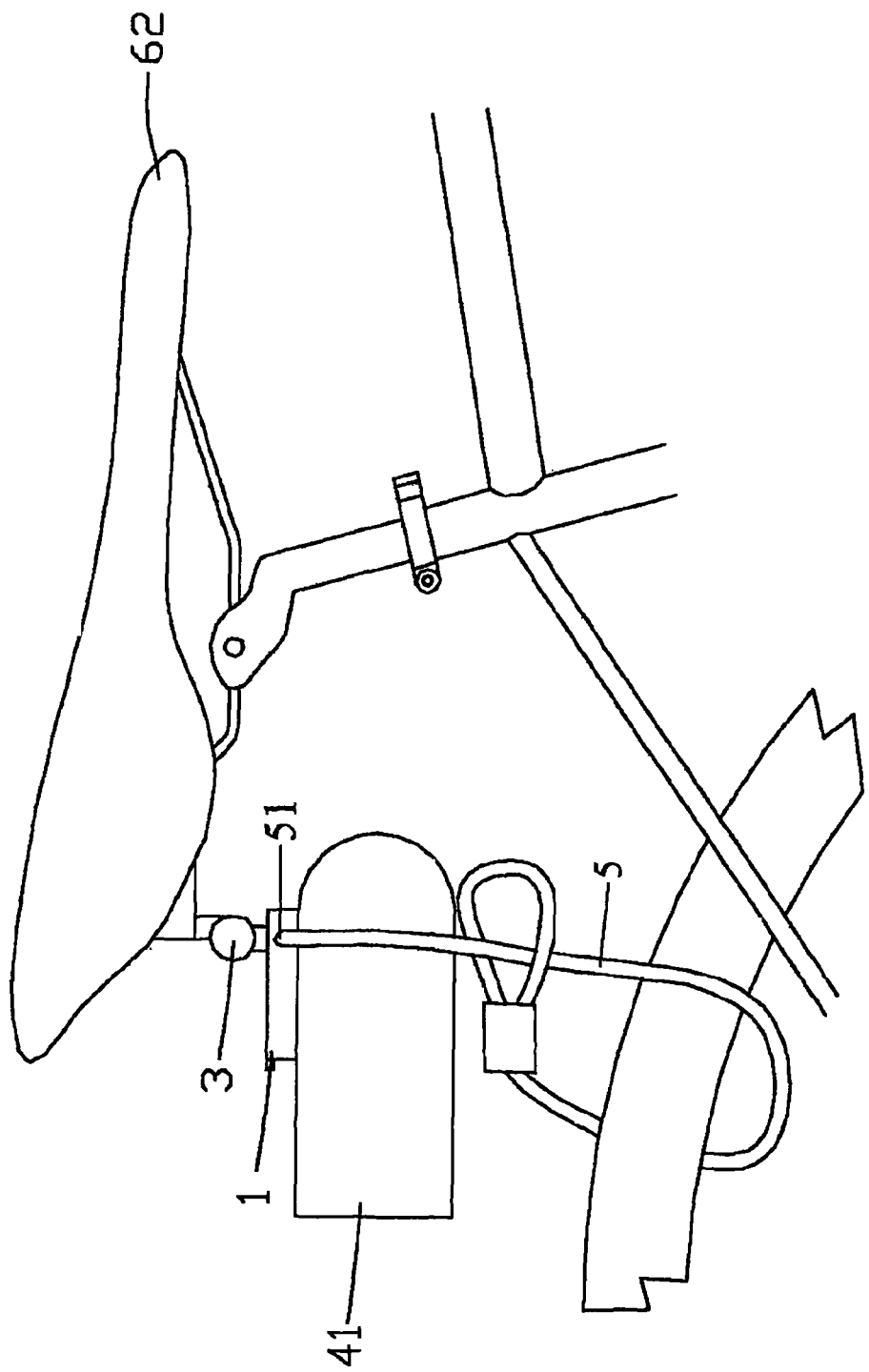

Please refer to FIGS. 7A and 7B, which show another variation of the first embodiment of the present invention. As shown in FIG. 7A, the adapting apparatus of the present invention include a base 1, a saddle connector 3, a cable 5 and a storage box 41 with an adaptor 2 fixed on the storage box 41. The storage box 41 can be mounted on the base 1 by inserting the adaptor 2 into the mounting dock of the base 1. The saddle connector 3 can be connected to the base 1 in a manner similar to that illustrated in FIGS. 6A-6B. The saddle connector 3 is then fixed to the suspension structure (not shown) under the saddle of a bicycle, as shown in FIG. 7B. One end of the cable lock 5 runs through the wheel and the loop at its other end in a manner similar to that illustrated in FIGS. 6A and 6B, and is inserted in the cable lock hole 51 of the base 1. After the cyclist locks the lock (not shown) on the base 1, the securing member 3, the storage box 41 and the cable lock 5 are all locked in the base 1 and achieve the anti-theft function.

Figure 8:
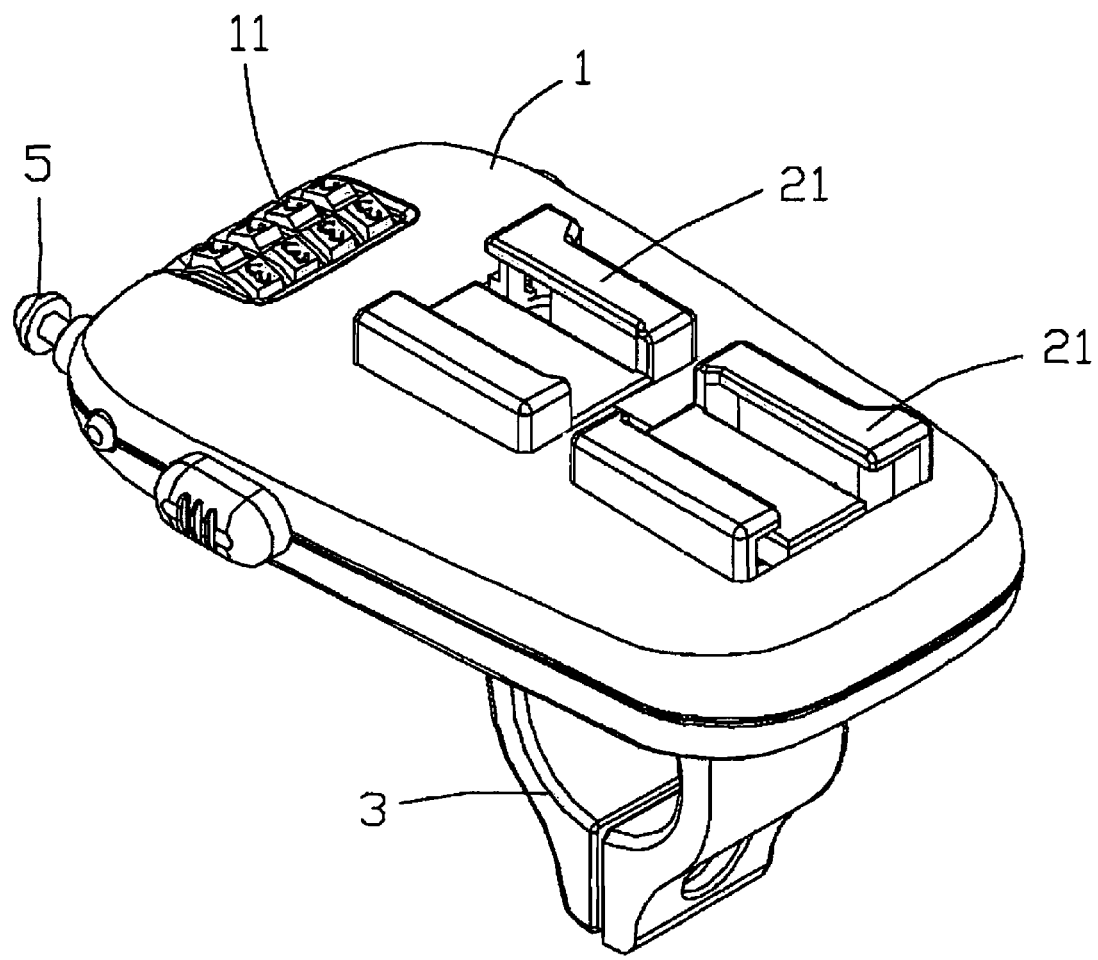
FIGS. 8-9 show the perspective view of the adapting apparatus of the second embodiment of the invention.
Figure 9:
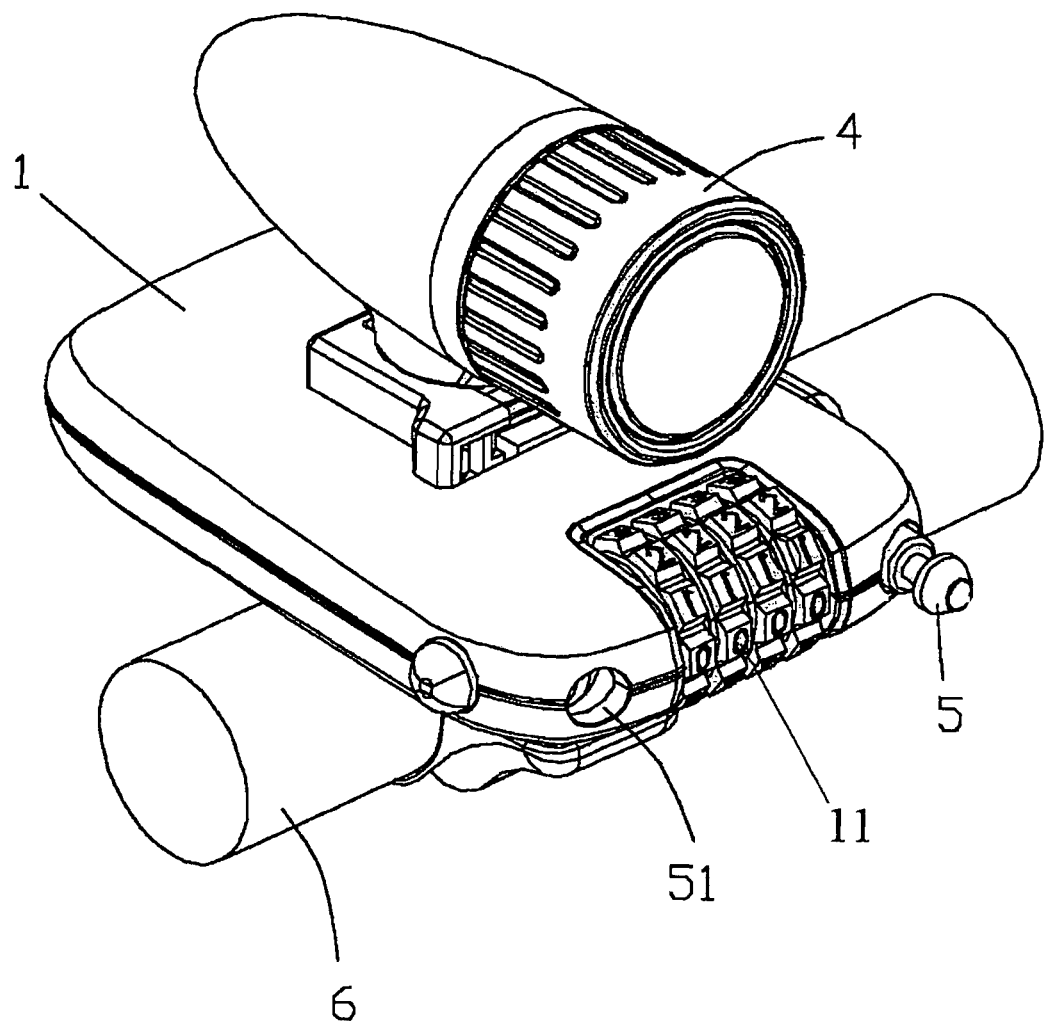

Please refer to FIGS. 8-9, which illustrate the adapting apparatus of the second embodiment of the present invention. In FIG. 8, an adapting base 1 is connected to a C-ring 3, which in turn is secured onto a handlebar 6 of a bicycle (not shown). The adapting base 1 includes a 4-digit combination lock and a mounting slot 21 on its surface for mounting at least one accessory equipment 4, as shown in FIG. 9. In the present embodiment the accessory equipment 4 is a flashlight, but other accessories can also be used. Non-limiting examples of the accessory equipments that can be used in the present invention are discussed with regard to FIG. 5, and will not be repeated here.

Additionally, the adapting base 1 may further comprise a retractable cable lock 5, the cable of which can be extended from and retracted to the adapting base 1. A cable lock hole 51 is also provided on the adapting base 1 such that one end of the cable can be inserted into the cable lock hole 51. The lock 11 of the adapting base 1 is configured so that once the cable lock 5 is inserted into the cable lock hole 51, it cannot be released unless the lock 11 is unlocked. This design provides additional advantage in that a cyclist can simply pull the cable 5 out from the adapting base 1, loops the cable around a parking rack, a light pole or any fixture and through the wheel, then secure the cable into the cable lock hole 51. As long as the lock 11 is locked, either by scrambling the combination or by using a key, the bicycle is secured.

Figure 10:
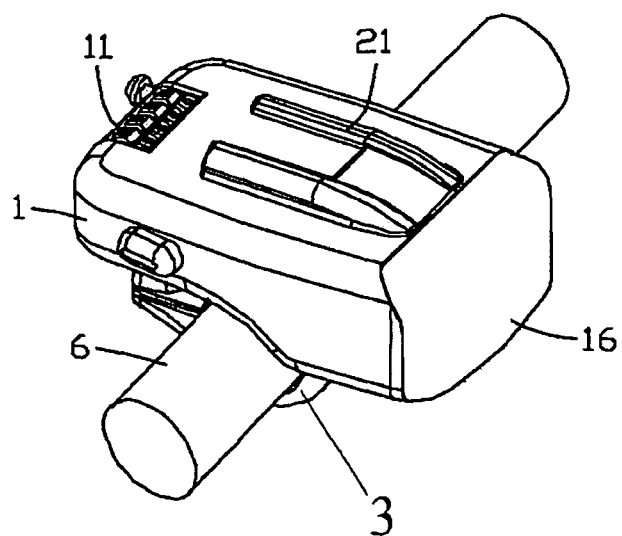
FIG. 10 shows the variation of the adapting apparatus of the second embodiment of the invention.

Please refer to FIG. 10 which illustrates a variation of the second embodiment of the present invention. In FIG. 10, an adapting base 1 is secured onto a handlebar of a bicycle through a C-ring 3. The adapting base is the same as in FIG. 8-9, except that a flashlight 16 is incorporated as an integral part of the adapting base 1 so that additional accessory equipments can be mounted thereon without losing the illuminating function.

Figure 12:
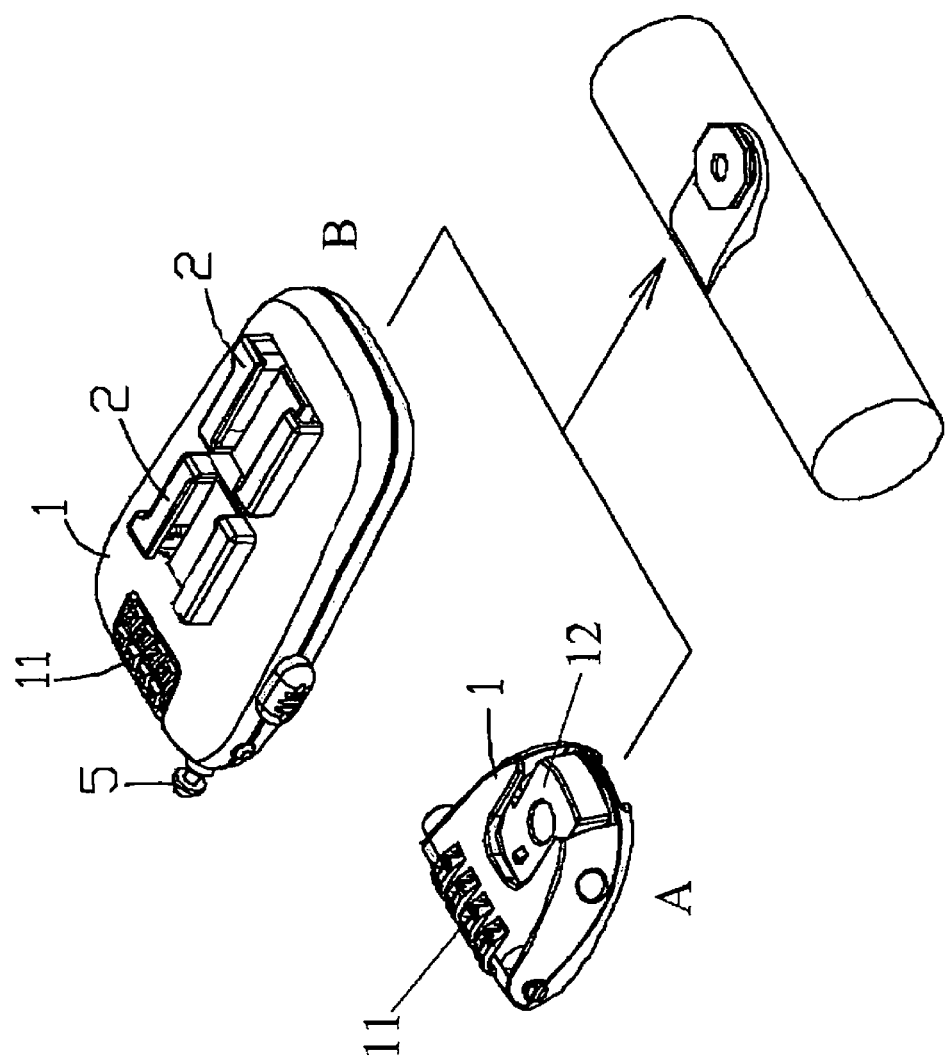
FIG. 12 shows the variation of the adapting apparatus of the third embodiment of the invention.

Please refer to FIG. 12 which illustrates a variation of the third embodiment of the present invention. This third embodiment includes a base 1 which is integrally built with a portion of a bicycle. The portion of the bicycle can be the handlebar, shifter, any part of the frame, seatpost or etc. The base 1 can comprise a mounting docket 12 to receive the accessory equipment, and a lock 11 (as shown in A). Alternatively, the base 1 can comprise an adaptor 2 to which an accessory equipment can be secured onto, and a lock 11 (as shown in B). The lock 11 can be a combination lock, a key lock, a cable lock or any variation thereof.

The lock 11 controls the detachability of the adaptor 2. The lock 11 can be configured such that the adaptor 2 can only be detached from the base 1 when the lock 11 is in the "unlock" position. If the lock 11 is a cable lock, it can be configured such that the cables can only be released when lock 11 is in the "unlock" position.

In another variation of this third embodiment, the adaptor 2 can be built integrally with the base 1. The lock 11 is configured such that the accessory equipment attached to the adaptor can only be removed when the lock is in the "unlock" position.

As can be readily understood from the preceding description, the spirit of the present invention lies in the interaction between the lock of the adapting base and the securing member, between the lock of the adapting base and the mounted accessory equipment, and between the lock of the adapting base and the cable lock. The adapting base is configured so that only when the lock is unlocked, i.e., when the correct combination has been entered or the correct key has been inserted, can the accessory equipments, the securing member and/or the cable lock be removed or released from the adapting base. Therefore, even though the cyclist does not remove the accessory equipment from the adapting base, as long as the lock is locked, the accessory equipment cannot be removed without physically damaging the adapting apparatus.

Likewise, the connection between the lock 11 of the adapting base 1 and the securing member 3 is configured so that only when the lock 11 is unlocked can the securing member 3 be detached from the adapting base 1. Therefore, so long as the lock 11 remains locked and the securing member 3 is properly secured onto the handlebar or seatpost of a bicycle, the adapting base connected to the securing member 3 cannot be detached without physically damaging the adapting base.

The portion of a bicycle on which the adapting apparatus of the present invention can be mounted is not limited, so long as proper fastening can be provided. Preferably the adapting apparatus is secured onto the handlebar, the down-tube, or the seatpost or the cushion mechanism under the saddle, but other configurations can also be considered by the present invention.

All the connecting mechanisms between the base/adapting base and the securing member, the connecting mechanisms between the adaptor/adapting base and the accessory equipments, and the connecting mechanisms between the base and the adaptor illustrated herein are not intended to be exhaustive. Many modifications or variations will become apparent to a person having ordinary skills in the art without deviating from the scope and spirit of the present invention.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modification and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An adapting apparatus for mounting an accessory equipment on a bicycle, comprising:
   a base having a mounting mechanism, a securing mechanism, a lock, at least one lock hole for accepting a cable, and a first fastening hole extending through the mounting mechanism along a first axis;
   an adaptor detachably mounted to the mounting mechanism of the base along a second axis, the adaptor having an adapting mechanism for connecting to an accessory equipment;
   a securing member detachably connected to the base through the securing mechanism and having a second fastening hole extending through the securing member along the first axis and aligning with the first fastening hole; and
   a fastening member extending through the first fastening hole and the second fastening hole such that the securing member is fastened to the base and to a portion of a bicycle;

wherein
the first axis being different from the second axis such that the mounting of the adaptor on the mounting mechanism prevents the removal of the fastening member; and the lock, the lock hole, the mounting mechanism and the adaptor being configured such that the adaptor can be detached from the mounting mechanism and the cable released from the lock hole only when the lock is unlocked.

2. The adapting apparatus as claimed in claim 1, wherein the lock, the securing mechanism, and the securing member are configured such that the securing member can be detached from the base only when the lock is unlocked.

3. The adapting apparatus as claimed in claim 1, wherein the securing member is a C-ring, a seatpost connector, a down-tube connector, and an adjustable belt.

4. The adapting apparatus as claimed in claim 3, wherein the securing member is a C-ring and the second fastening hole extends through both ends of the C-ring.

5. The adapting apparatus as claimed in claim 1, wherein the fastening member includes a bolt and a nut.

6. The adapting apparatus as claimed in claim 1, wherein the lock is a combination lock, a key-hole lock, or a combination thereof.

7. The adapting apparatus as claimed in claim 1, wherein the lock is a retractable cable lock and integrated in the base such that one end of the cable can be inserted into the lock hole of the base.

* * * * *